United States Patent [19]

Cieslak

[11] Patent Number: 4,583,192

[45] Date of Patent: Apr. 15, 1986

[54] MOS FULL ADDER CIRCUIT

[75] Inventor: Ronald H. Cieslak, Chicago, Ill.

[73] Assignee: Motorola, Inc., Schaumburg, Ill.

[21] Appl. No.: 538,039

[22] Filed: Sep. 30, 1983

[51] Int. Cl.⁴ .............................................. G06F 7/50
[52] U.S. Cl. .................................................. 364/784
[58] Field of Search ...................... 364/784, 785, 786

[56] References Cited

U.S. PATENT DOCUMENTS

| | | | |
|---|---|---|---|
| 3,766,371 | 10/1973 | Suzuki | 364/784 |
| 4,071,905 | 1/1978 | Oguchi et al. | 364/784 |
| 4,417,314 | 11/1983 | Best | 364/785 |
| 4,471,454 | 9/1984 | Dearden et al. | 364/786 |
| 4,523,292 | 6/1985 | Armer | 364/786 |

OTHER PUBLICATIONS

Varadarajan, "Full Binary Adder Employing Fewer Components", *IBM Technical Disclosure Bulletin*, vol. 18, No. 9, Feb. 1976, p. 2880.

Mano, *Digital Logic and Computer Design*, Prentice-Hall, Inc., 1979, pp. 119-123.

*Primary Examiner*—David H. Malzahn
*Attorney, Agent, or Firm*—Anthony J. Sarli, Jr.; Jeffrey Van Myers; Robert L. King

[57] ABSTRACT

An MOS full adder circuit having a sum circuit portion and a carry circuit portion is provided. In an embodiment utilizing transistors of opposite conductivity type, both the sum and carry circuits are symmetrical, thereby simplifying the physical layout of the full adder during fabrication.

8 Claims, 4 Drawing Figures 4,583,192

MOS FULL ADDER CIRCUIT

TECHNICAL FIELD

This invention relates generally to arithmetic circuits and, more particularly, to adder circuits having a carry portion and a sum portion.

BACKGROUND ART

There are many forms of arithmetic circuits which are combinational circuits that perform the addition of two or three input bits. A full-adder circuit which forms the arithmetic sum of three input bits has a well known truth table as described on page 121 of *Digital Logic and Computer Design* by M. Morris Mano (Prentice-Hall, Inc., 1979). Known implementations of full adder circuits include a sum of products implementation, a product of sums implementation and two half-adders combined with an exclusive OR circuit. Disadvantages of previous implementations include speed, transistor count and physical layout considerations.

SUMMARY OF THE INVENTION

It is an object of the present invention to provide an improved MOS full adder circuit.

Another object of the present invention is to provide an improved full adder circuit having a sum portion and a carry portion which are each symmetrical for physical layout purposes.

In carrying out the above and other objects of the present invention, there is provided, in one form, an MOS full adder circuit having a carry portion for providing an output carry bit and a sum portion for providing an output sum bit. The output sum bit represents the sum of first and second input bits for a predetermined input carry bit, and the output carry bit represents the carry bit associated with the sum. In an illustrated embodiment, the output sum and carry bits are provided in complement form. The carry portion comprises first and second transistors of a first conductivity type connected in series via a first node for selectively coupling a power supply terminal to an output terminal in response to the input carry bit and the first input bit, respectively. Third and fourth transistors of the first conductivity type are connected in series via a second node for selectively coupling the power supply terminal to the output terminal in response to the first input bit and the second input bit, respectively. A first bridge transistor connects the first and second nodes together in response to the second input bit. Fifth and sixth transistors of a second conductivity type are connected in series via a third node to selectively couple a reference terminal to the output terminal in response to the first input bit and the carry input bit. Seventh and eighth transistors of the second conductivity type are connected in series via a fourth node to selectively couple the reference terminal to the output terminal in response to the second and first input bits, respectively. A second bridge transistor selectively couples the third and fourth nodes together in response to the first input bit. The sum portion comprises transistors connected in a manner analogous to the transistors of the carry portion and provides the output sum bit in response to the input carry bit, the first and second input bits and the output carry bit.

The above and other objects, features and advantages of the present invention will be more clearly understood from the following detailed description taken in conjunction with the following drawings.

BRIEF DESCRIPTION OF THE DRAWINGS

FIG. 1(*b*) illustrates in schematic form a sum circuit portion of a full adder circuit.

DETAILED DESCRIPTION OF THE PRESENT INVENTION

Figure 1A:
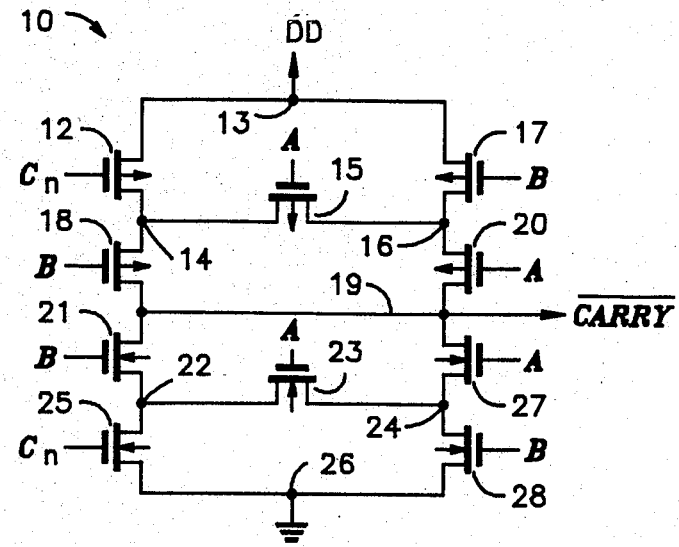
FIG. 1(*a*) illustrates in schematic form a carry circuit portion of a full adder circuit.

Shown in FIGS. 1(*a*) and 1(*b*) are a carry circuit portion 10 and a sum circuit portion 11, respectively, which together form a full adder circuit. Carry circuit portion 10 implements the following known logic equation for a full adder circuit:

$$\text{Carry} = AB + BC_n + AC_n \tag{1}$$

where A and B are input bits to be added and $C_n$ is an input carry bit. Sum circuit portion 11 implements the following known logic equation for a full adder circuit:

$$\text{SUM} = ABC_n + (A + B + C_n)\overline{\text{Carry}}. \tag{2}$$

While both the sum and carry output bits are provided in complement form by portions 10 and 11 for reasons to be described below, the sum and carry output bits may be provided in opposite form by coupling the output bits to a conventional inverting circuit. It should be readily apparent that the present invention may be practiced by utilizing either carry circuit portion 10 or sum circuit portion 11 with other known sum circuits or carry circuits, respectively, or practiced by utilizing both circuits 10 and 11 together. While specific N-channel and P-channel MOS devices are shown, it should also be clear that carry circuit 10 and sum circuit 11 could be implemented by completely reversing the processing techniques (e.g. P-channel to N-channel) or by using other types of transistors.

Referring to FIG. 1(*a*), carry circuit portion 10 is comprised of a P-channel transistor 12 having a source electrode connected to a power supply terminal 13 for receiving a supply voltage $V_{DD}$. A gate electrode of transistor 12 is connected to input carry bit $C_n$, and a drain electrode of transistor 12 is connected to a node 14. A P-channel bridge transistor 15 has a source electrode connected to node 14, a gate electrode for receiving first input bit A, and a drain electrode connected to a node 16. A P-channel transistor 17 has a source electrode connected to power supply terminal 13, a gate electrode for receiving second input bit B, and a drain electrode connected to node 16. A P-channel transistor 18 has a source electrode connected to node 14, a gate electrode for receiving second input bit B, and a drain electrode connected to an output terminal 19 for providing a complementary output carry bit, $\overline{\text{CARRY}}$. A P-channel transistor 20 has a source electrode connected to node 16, a drain electrode connected to output terminal 19, and a gate electrode for receiving first input bit A. An N-channel transistor 21 has a drain electrode connected to output terminal 19, a gate electrode connected to second input bit B, and a source electrode connected to a node 22. An N-channel bridge transistor 23 has a drain electrode connected to node 22, a gate electrode connected to first input bit A, and a source electrode connected to a node 24. An N-channel transistor 25 has a drain electrode connected to node 22, a gate electrode connected to input carry bit $C_n$, and a source electrode connected to a reference potential node 26 such as ground. An N-channel transistor 27 has a drain electrode connected to output terminal 19, a gate electrode connected to first input bit A, and a source electrode connected to node 24. An N-channel transistor 28 has a drain electrode connected to node 24, a gate electrode connected to second input bit B, and a source electrode connected to reference potential node 26.

In operation, carry circuit portion 10 implements logic equation (1) by utilizing input bits A and B in association with input carry bit $C_n$ to provide an output carry bit in complement form. An understanding of the operation of carry circuit 10 may be facilitated by referring to the following truth table.

(I)

| $C_n$ | A | B | Carry |
|---|---|---|---|
| 0 | 0 | 1 | 1 |
| 0 | 1 | 0 | 1 |
| 0 | 0 | 0 | 1 |
| 0 | 1 | 1 | 0 |

Truth table (I) illustrates logic states of the complement output carry bit for the possible logic combinations of input bits A and B when the input carry bit $C_n$ is a logic zero. For example, when input bit A is at a logic zero level and input bit B is at a logic one level, bridge transistor 15 and transistors 12 and 20 are made conductive and bridge transistor 23 and transistors 25 and 27 are made nonconductive. The effect is to provide a logic one level signal at output terminal 19 which represents that there is no output carry bit when $C_n$ is 0 and input bits A and B are 0 and 1, respectively. To further illustrate the operation of carry circuit 10 when the $C_n$ bit is a logic zero, assume that both input bits A and B are at a logic one level. Bridge transistor 15 and transistors 17, 18 and 20 are all nonconductive. Transistors 27 and 28 are conductive so that the complement output carry bit at output terminal 19 is at a logic zero level. This logic zero represents that there is an output carry bit when $C_n$ is 0 and input bits A and B are both 1. In an analogous manner, the complement output carry bit may be determined to be at a logic one level when both input bits are at a logic zero level or when input bit A is at a logic one level and input bit B is at a logic zero level.

When the carry-in bit $C_n$ is at a logic one level, the truth table of carry circuit 10 is as follows.

(II)

| $C_n$ | A | B | Carry |
|---|---|---|---|
| 1 | 0 | 1 | 0 |
| 1 | 1 | 0 | 0 |
| 1 | 0 | 0 | 1 |
| 1 | 1 | 1 | 0 |

Truth table (II) illustrates the logic state of the complement output carry bit for all possible logic combinations of input bits A and B when the input carry bit is at a logic one. For example, when input bit A is at a logic zero level and input bit B is at a logic one level, transistors 12, 17 and 18 are nonconductive and transistors 21 and 25 are conductive so that the complement output carry bit at output terminal 19 is at a logic zero level. This is arithmetically correct for the addition of 0 and 1 with an input carry bit of 1 which should produce an output carry bit of 1. Similarly, when both input bits A and B are at a logic zero level, transistors 17 and 20 are conductive and transistors 21 and 27 are nonconductive thereby producing a logic high complement output carry bit. This is also arithmetically correct for the addition of 0 and 0 with an input carry bit of 0. The remainder of the truth table may be verified in an analogous manner.

It should be readily apparent from carry circuit 10 that the structure is such that an output carry bit of zero will always be provided when both input bits A and B are logic zero regardless of the input carry bit. Since the appropriate reference node is coupled to the output via only two transistors in this case, very small gate delay occurs.

Sum circuit portion 11 comprises a P-channel transistor 30 having a source electrode connected to a power supply terminal 31 for receiving supply voltage $V_{DD}$. A gate electrode of transistor 30 is connected to the carry input bit $C_n$, and a drain electrode of transistor 30 is connected to a node 32. A P-channel transistor 33 has a source electrode connected to node 32, a gate electrode connected to input bit A, and a drain electrode connected to a node 35. A P-channel transistor 36 has a source electrode connected to power supply terminal 31, a gate electrode connected to the complementary carry output signal of carry circuit 10, and a drain electrode connected to node 35. A P-channel transistor 37 has a source electrode connected to node 32, a gate electrode connected to the complementary carry output bit, and a drain electrode connected to an output terminal 38 for providing a sum output bit in complement form. A P-channel transistor 40 has a source electrode connected to node 35, a gate electrode connected to input bit B, and a drain electrode connected to output terminal 38. An N-channel transistor 41 has a drain electrode connected to output terminal 38, a gate electrode connected to second input bit B, and a source electrode connected to a node 42. An N-channel transistor 43 has a drain electrode connected to node 42, a gate electrode connected to first input bit A, and a source electrode connected to a node 45. An N-channel transistor 46 has a drain electrode connected to output terminal 38, a gate electrode connected to the complementary carry output bit, and a source electrode connected to node 45. An N-channel transistor 47 has a drain electrode connected to node 42, a gate electrode connected to the complementary carry output bit, and a source electrode connected to a reference node 48 such as ground. An N-channel transistor 49 has a drain electrode connected to node 45, a gate electrode connected to the input carry bit $C_n$, and a source electrode connected to reference node 48.

In operation, sum circuit 11 implements logic equation (2) by utilizing input bits A and B in association with input carry bit $C_n$ and the output carry bit in complement form to provide an output sum bit in complement form. An understanding of the operation of sum circuit 11 may be facilitated by referring to the following truth table.

| $C_n$ | A | B | $\overline{\text{Carry}}$ | $\overline{\text{Sum}}$ | (III) |
|---|---|---|---|---|---|
| 0 | 0 | 1 | 1 | 0 | |
| 0 | 1 | 0 | 1 | 0 | |
| 0 | 0 | 0 | 1 | 1 | |
| 0 | 1 | 1 | 0 | 1 | |

Truth table (III) illustrates logic states of the complement sum bit for the possible logic combinations of input bits A and B when the input carry bit $C_n$ is a logic zero and carry circuit 10 is utilized in conjunction with sum circuit 11. Since sum circuit 11 is analogous in structure and operation to carry circuit 10, a detailed explanation of the operation of sum circuit 11 will not be given but can be easily verified from the truth table.

When the input carry bit $C_n$ is at a logic zero level, the truth table of sum circuit 11 is as follows.

| $C_n$ | A | B | $\overline{\text{Carry}}$ | $\overline{\text{Sum}}$ | (IV) |
|---|---|---|---|---|---|
| 1 | 0 | 1 | 0 | 1 | |
| 1 | 1 | 0 | 0 | 1 | |
| 1 | 0 | 0 | 1 | 0 | |
| 1 | 1 | 1 | 0 | 0 | |

The truth table (IV) illustrates logic states of the complement sum bit for the possible logic combinations of input bits A and B when the input carry bit $C_n$ is a logic one and carry circuit 10 is utilized in conjunction with sum circuit 11. Similarly, the operation of sum circuit 11 may be easily verified from truth table (IV).

Figure 1B:
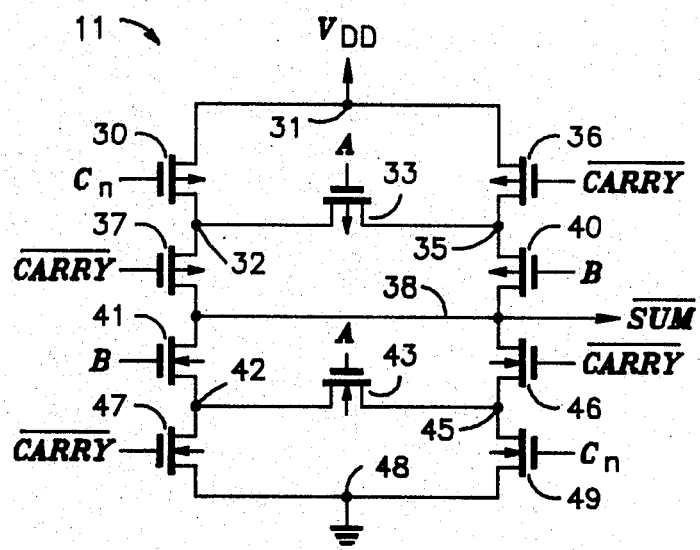

It should be apparent that the full adder of FIGS. 1(a) and 1(b) are physically symmetrical. As a result, physical layout of the full adder circuit during fabrication is simplified. The use of an output carry bit or an output sum bit in complement form may result in size and speed savings in known arithmetic array circuits such as a multiplier circuit or a parallel adder circuit which invert carry or sum bits between arrays or stages to reduce logic delays and size. Since the full adder circuit of FIGS. 1(a) and 1(b) are symmetrical, two logic definitions exist. Therefore, if the output sum and carry bits are desired in noninverted form, the full adder performs in accordance with the truth table if input bits A, B and $C_n$ are inverted.

Figure 2A:
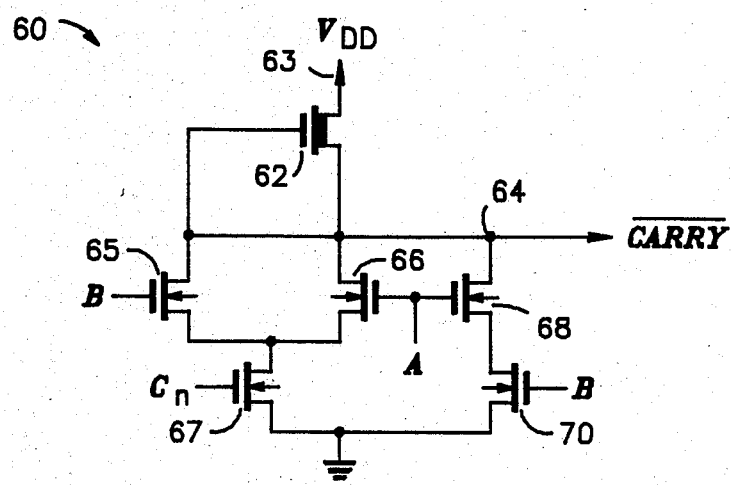
FIGS. 2(*a*) and 2(*b*) illustrate in schematic form another embodiment of a carry circuit and a sum circuit, respectively, of a full adder circuit.

Shown in FIGS. 2(a) and (b) is another form of the present invention utilizing transistors of a single conductivity type and input bits A, B, and input carry bit $C_n$ previously described. It should be readily noted that the circuit of FIG. 2(a) differs in structure from the circuit of FIG. 2(b) and does not utilize a transistor analogous to a bridge transistor such as transistors 15, 23, 33 and 43 of FIGS. 1(a) and (b). The purpose of illustrating different structures for a carry circuit and a sum circuit is to emphasize the fact that the present invention may be utilized in only a sum circuit or a carry circuit. Therefore, other sum or carry circuit structures may be utilized in conjunction with the present invention to form an adder circuit as opposed to using the present invention in both a sum and a carry circuit portion to provide a full adder circuit.

Referring to FIG. 2(a) which illustrates a second embodiment of the present invention, a carry circuit 60 comprises a depletion mode N-channel transistor 62 having a drain electrode connected to a supply voltage terminal 63 for receiving a supply voltage such as $V_{DD}$. Both a gate electrode and a source electrode of transistor 62 are connected together to an output terminal 64 for providing an output carry bit in complement form. An N-channel transistor 65 has a drain electrode connected to output terminal 64, a gate electrode connected to input bit B, and a source electrode. An N-channel transistor 66 has a drain electrode connected to output terminal 64, a gate electrode connected to input bit A, and a source electrode. An N-channel transistor 67 has a drain electrode connected to both source electrodes of transistors 65 and 66, a gate electrode connected to carry input bit $C_n$, and a source electrode connected to ground. An N-channel transistor 68 has a drain electrode connected to output terminal 64, a gate electrode connected to both the gate of transistor 66 and input bit A, and a source electrode. An N-channel transistor 70 has a drain electrode connected to the source electrode of transistor 68, a gate electrode connected to input bit B, and a source electrode connected to ground.

Figure 2B:
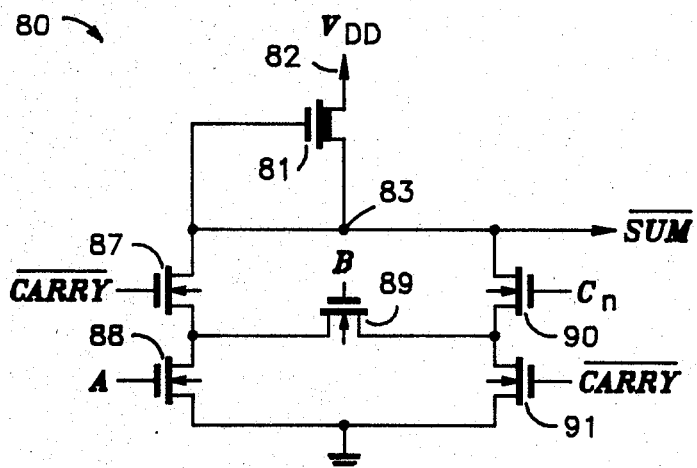

Referring to FIG. 2(b), a sum circuit 80 has a depletion mode N-channel transistor 81 having a drain electrode connected to a power supply terminal 82 for receiving a supply voltage $V_{DD}$. Both a gate electrode and a source electrode of transistor 81 are connected together to an output terminal 83 for providing an output sum bit in complement form. An N-channel transistor 87 has a drain electrode connected to output terminal 83, a gate electrode connected to the output carry bit in complement form, and a source electrode. An N-channel transistor 88 has a drain electrode connected to the source electrode of transistor 87, a gate electrode connected to input bit A, and a source electrode connected to ground. An N-channel bridge transistor 89 has a drain electrode connected to both the source electrode of transistor 87 and the drain electrode of transistor 88, and a source electrode. A gate electrode of transistor 89 is connected to input bit B. An N-channel transistor 90 has a drain electrode connected to output terminal 83, a gate electrode connected to input carry bit $C_n$, and a source electrode. An N-channel transistor 91 has a drain electrode connected to both source electrodes of transistors 89 and 90, a gate electrode connected to the output carry bit in complement form, and a source electrode connected to ground.

In operation, carry circuit 60 functions in accordance with truth tables (I) and (II) to provide an output carry bit in complement form. Normally, transistor 62 functions as a depletion load device to couple supply voltage $V_{DD}$ to output terminal 64 when the gate electrode of transistor 62 is not clamped to a low logic level. When output terminal 64 is coupled to ground potential as a result of the logic state of bits A, B and $C_n$, transistor 62 conducts substantially less current and the output of carry circuit 60 is at a substantially logic zero level.

Similarly, sum circuit 80 functions in accordance with truth tables (III) and (IV) to provide an output sum bit in complement form in response to bits A, B, $C_n$ and the carry bit in complement form. Transistor 81 functions in a manner analogous to transistor 62 to provide a logic one level at output terminal 83 unless output terminal 83 is coupled to ground via one of three paths provided by transistors 87, 88, 89, 90 and 91. When output terminal 83 is coupled to ground, conduction of transistor 81 is substantially reduced. The circuit of FIG. 2(b) is substantially symmetrical which simplifies the physical layout of the circuit during fabrication.

By now it should be apparent that a full adder circuit utilizing a bridge transistor has been provided. Layout considerations are simplified without sacrificing either size or speed.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

I claim:

1. In an MOS full adder circuit, an output carry bit circuit for providing an output carry bit resulting from the addition of a first and a second input add bit in association with a predetermined input carry bit, said output carry bit circuit comprising:
   a first transistor of a first conductivity type having a first current electrode connected to a power supply terminal, a control electrode for receiving the input carry bit, and a second current electrode connected to a first node;
   a second transistor of the first conductivity type having a first current electrode connected to the first node, a control electrode for receiving the first input add bit, and a second current electrode connected to an output terminal for providing the output carry bit;
   a third transistor of the first conductivity type having a first current electrode connected to the power supply terminal, a control electrode for receiving the first input add bit, and a second current electrode connected to a second node;
   a fourth transistor of the first conductivity type having a first current electrode connected to the second node, a control electrode for receiving the second add bit, and a second current electrode connected to the output terminal;
   a first bridge transistor of the first conductivity type having a first current electrode connected to the first node, a control electrode for receiving the second input add bit, and a second current electrode connected to the second node, for selectively bridging the first node to the second node;
   a fifth transistor of a second conductivity type having a first current electrode connected to the output terminal, a control electrode for receiving the first input add bit, and a second current electrode connected to a third node;
   a sixth transistor of the second conductivity type having a first current electrode connected to the third node, a control electrode for receiving the input carry bit, and a second current electrode connected to a reference terminal;
   a seventh transistor of the second conductivity type having a first current electrode connected to the output terminal, a control electrode for receiving the second input add bit, and a second current electrode connected to a fouth node;
   an eighth transistor of the second conductivity type having a first current electrode connected to the fourth node, a control electrode for receiving the first input add bit, and a second current electrode connected to the reference terminal; and
   a second bridge transistor of the second conductivity type having a first current electrode connected to the third node, a control electrol for receiving the second input add bit, and a second current electrode connected to the fourth node, for selectively bridging the third node to the fourth node.

2. In an MOS full adder circuit, a sum bit circuit for providing a sum bit resulting from the addition of a first and a second input add bit in association with a predetermined input carry bit, said sum bit circuit comprising:
   a first transistor of a first conductivity type having a first current electrode connected to a power supply terminal, a control electrode for receiving an input carry bit, and a second current electrode connected to a first node;
   a second transistor of the first conductivity type having a first current electrode connected to the first node, a control electrode for receiving an output carry bit associated with the addition of the first and second input add bits, and a second current electrode connected to an output terminal for providing the sum bit;
   a third transistor of the first conductivity type having a first current electrode connected to the power supply terminal, a control electrode for receiving the output carry bit, and a second current electrode connected to a second node;
   a fourth transistor of the first conductivity type having a first current electrode connected to the second node, a control electrode for receiving the second add bit, and a second current electrode connected to the output terminal;
   a first bridge transistor of the first conductivity type having a first current electrode connected to the first node, a control electrode for receiving the first input add bit, and a second current electrode connected to the second node, for selectively bridging the first node to the second node;
   a fifth transistor of a second conductivity type having a first current electrode connected to the output terminal, a control electrode for receiving the second input add bit, and a second current electrode connected to a third node;
   a sixth transistor of the second conductivity type having a first current electrode connected to the third node, a control electrode for receiving the output carry bit, and a second current electrode connected to a reference terminal;
   a seventh transistor of the second conductivity type having a first current electrode connected to the output terminal, a control electrode for receiving the output carry bit, and a second current electrode connected to a fourth node;
   an eighth transistor of the second conductivity type having a first current electrode connected to the fourth node, a control electrode for receiving the input carry bit, and a second current electrode connected to the reference terminal; and
   a second bridge transistor of the second conductivity type having a first current electrode connected to the third node, a control electrol for receiving the first input add bit, and a second current electrode connected to the fourth node, for selectively bridging the third node to the fourth node.

3. In an MOS full adder circuit having transistors of a single conductivity type, an output carry bit circuit for providing an output carry bit resulting from the addition of a first and a second input add bit in association with a predetermined input carry bit, said output carry bit circuit comprising:

load means connected between a supply voltage terminal for receiving a supply voltage and an output terminal for providing the output carry bit;

a first transistor having a first current electrode connected to the output terminal, a control electrode for receiving the first input add bit, and a second current electrode;

a second transistor having a first current electrode connected to the output terminal, a control electrode for receiving the second input add bit, and a second current electrode;

a third transistor having a first current electrode connected to both of the second current electrodes of the first and second transistors, a control electrode for receiving the input carry bit, and a second current electrode connected to a reference node;

a fourth transistor having a first current electrode connected to the output terminal, a control electrode for receiving the first input add bit, and a second current electrode; and a fifth transistor having a first current electrode connected to the second current electrode of the fourth transistor, a control electrode for receiving the second input add bit, and a second current electrode connected to the reference node.

4. The MOS full adder circuit of claim 3, wherein said load means of the output carry bit circuit further comprises:

a sixth transistor having a first current electrode connected to a supply voltage terminal for receiving a supply voltage, and both a control electrode and a second current electrode connected together to the output terminal.

5. The MOS full adder circuit of claim 4, wherein said sixth transistor of the load means of the output carry bit circuit is a depletion type transistor.

6. In an MOS full adder circuit having transistors of a single conductivity type, a sum bit circuit for providing a sum bit resulting from the addition of a first and a second input add bit in association with a predetermined input carry bit, said sum bit circuit comprising:

load means connected between a supply voltage terminal and an output terminal for providing the sum bit;

a first transistor having a first current electrode connected to the output terminal, a control electrode for receiving an output carry bit associated with the addition of the first and second add bits, and a second current electrode connected to a first node;

a second transistor having a first current electrode connected to the first node, a control electrode connected to the first input add bit, and a second current electrode connected to a reference node;

a third transistor having a first current electrode connected to the output terminal, a control electrode for receiving the input carry bit, and a second current electrode connected to a second node;

a fourth transistor having a first current electrode connected to the second node, a control electrode for receiving the output carry bit, and a second current electrode connected to the reference node; and a bridge transistor for selectively coupling the first and second nodes having a first current electrode connected to the first node, a second current electrode connected to the second node, and a control electrode for receiving the second input bit.

7. The MOS full adder circuit of claim 6 wherein said load means of the sum bit circuit further comprise:

a fifth transistor having a first current electrode connected to a supply voltage terminal for receiving a supply voltage, and both a control electrode and a second current electrode connected together to the output terminal.

8. The MOS full adder circuit of claim 7 wherein said fifth transistor of the sum bit circuit is a depletion type transistor.

* * * * *